Dec. 30, 1969      C. R. HOLT      3,486,435

AIRCRAFT PRESSURIZATION SYSTEM

Filed Feb. 8, 1968      2 Sheets-Sheet 2

United States Patent Office 3,486,435
Patented Dec. 30, 1969

3,486,435
AIRCRAFT PRESSURIZATION SYSTEM
Charles R. Holt, Norman, Okla., assignor to North American Rockwell Corporation, Pittsburgh, Pa., a corporation of Delaware
Filed Feb. 8, 1968, Ser. No. 704,173
Int. Cl. B64d *13/02*
U.S. Cl. 98—1.5                         17 Claims

ABSTRACT OF THE DISCLOSURE

An aircraft pressurization system utilizing jet compressors for augmenting a relatively small quantity of high pressure engine bleed air with low pressure atmospheric air, the augmented flow then being diffused to an intermediate pressure for delivery to the aircraft cabin or other point of use.

---

This invention relates to an aircraft pressurization system and, more particularly, to an aircraft cabin pressurization system utilizing jet compressors for augmenting engine bleed air with atmospheric air.

In modern aircraft, it is desirable and often necessary for the comfort and safety of the crew and passengers to pressurize the aircraft cabin during operation at high altitudes. Various approaches have been used in the past for supplying the cabin with a suitable quantity of compressed air at the desired pressure and a comfortable temperature. One such approach has been to extract energy mechanically from the aircraft engine to drive a pressurization system compressor sized to deliver a sufficient quantity of pressurized air. Similar systems utilize exhaust products in the case of internal combustion aircraft engines and high pressure compressor bleed air in the case of gas turbine aircraft engines to drive small turbines, which in turn drive pressurization system compressors. While these arrangements are quite economical from a standpoint of the amount of energy extracted from the aircraft propulsion system, the apparatus itself is relatively bulky, heavy and difficult and expensive to manufacture and maintain. While these latter factors are indeed significant in all aircraft, they are of particular concern in small and lightweight aircraft in which the size, weight and expense of state-of-the-art compression apparatus can be disproportionally and prohibitively large. To alleviate these problems in aircraft propelled by gas turbine engines, compressor bleed air is sometimes extracted in sufficient quantities to pressurize the cabin. While this approach thus eliminates the need for auxiliary compression equipment, it is not entirely satisfactory in that it requires the extraction of rather large quantities of compressed air from the propulsion system. More particularly, the extraction of a large quantity of compressed air for cabin pressurization results in the loss to the propulsion system of the correspondingly large amount of energy used in compressing the air, the result being inefficient engine operation in terms of fuel consumption. Furthermore, in order to furnish the entire supply of cabin pressurization air, the engine must be somewhat larger and heavier than it would have to be if it were used only to propel the aircraft.

It is therefore an object of this invention to provide an improved cabin pressurization system for aircraft.

Another object of this invention is to provide an aircraft pressurization system that is relatively simple and efficient.

A further object is to provide a cabin pressurization system that is economical in the amount of energy it extracts from the aircraft propulsion system without being bulky, heavy and expensive to manufacture and maintain.

Briefly stated, in carrying out the invention in one form, an aircraft pressurization system includes at least one primary jet compressor having a mixing chamber, a nozzle positioned to discharge into the mixing chamber, and a diffuser for receiving fluid from the mixing chamber. Suitable supply means are provided for supplying relatively low pressure atmospheric air to the mixing chamber and high pressure air, preferably compressor bleed air in an aircraft propelled by gas turbine engines, to the nozzle. Within the mixing chamber, the high velocity air discharged by the nozzle entrains the lower pressure atmospheric air, and the augmented flow is then diffused to an intermediate pressure in the diffuser from which it is supplied to the aircraft cabin or other point of use. In aircraft cabin pressurization systems, the exhaust means for supplying the pressurized air to the cabin includes heat exchange apparatus for selectively extracting heat from the air so as to permit the cabin temperature to be varied within a reasonable range. In one form, the heat exchange apparatus utilizes atmospheric ram air as the heat exchange medium.

By a further aspect of the invention, there are as many primary jet compressors as there are engines in a gas turbine powered aircraft, each primary jet compressor communicating with a respective one only of the engines. To provide additional air flow under certain conditions, the pressurization system further includes an auxiliary jet compressor having a mixing chamber communicating with the supply of low pressure atmospheric air and a nozzle communicating with the compressor of each of the gas turbine engines. Suitable valves are provided for controlling the flow of compressor bleed air to the various jet compressors, and check valves are provided to prevent reverse flow of pressurized air through either inoperative jet compressors or inoperative engines. By a still further aspect of the invention, the vacuum system of the aircraft utilizes a jet compressor arrangement in which the air extracted by the vacuum system is used to augment the flow of pressurized air.

While the invention is distinctly claimed and particularly pointed out in the claims appended hereto, the invention will be better understood and appreciated, along with other objects and features thereof, by reference to the following detailed description when considered in conjunction with the accompanying drawings in which:

Figure 1:
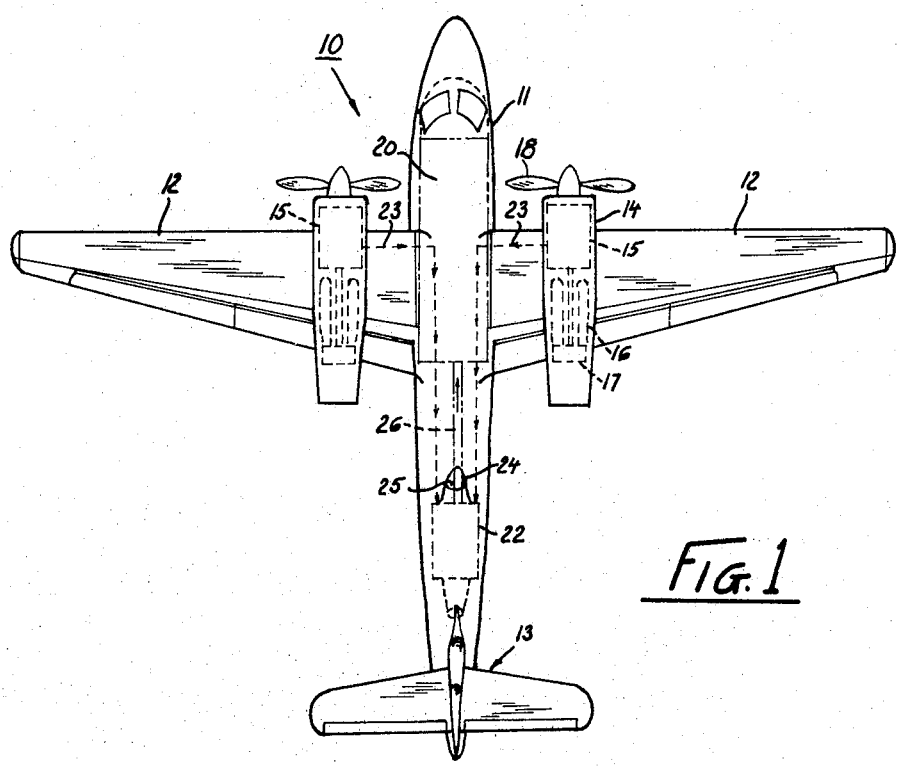
FIGURE 1 is a plan view of an aircraft equipped with a pressurization system of this invention.

Referring first to FIGURE 1, an aircraft illustrated generally by the numeral 10 is illustrated, the aircraft 10 having an elongated fuselage 11, a pair of wings 12 projecting laterally from opposite sides of the fuselage 11, and a tail assembly 13. To provide propulsive thrust, a pair of gas turbine engines 14 of the turboprop type are mounted on the wings 12, each engine 14 including a compressor 15 for compressing inlet air to high pressure, a combustor 16 within which the compressed air supports combustion, and turbine apparatus 17 driven by the high temperature products of combustion and driving, in turn, the compressor 15 and a propeller 18. As illustrated by broken lines, the fuselage 11 has a substantially closed cabin 20 therein. For comfort and safety during operation at high altitudes, the cabin 20 is pressurized by a pressurization system including a pressurization unit 22 located within the fuselage 11 adjacent the tail assembly 13, conduits 23 for supplying high pressure compressor bleed air to the pressurization unit 22, and an intake system including an inlet 24 and a conduit 25 for supplying low pressure atmospheric air to the pressurization unit 22. Pressurized air at a pressure between that of the compressor bleed air and that of the atmosphere is delivered during aircraft operation to the cabin 20 from the pressurization unit 22 through exhaust ducting 26.

As indicated above, the pressurization system of this invention utilizes a relatively small amount of compressor bleed air to produce a relatively large flow of compressed air to the cabin 20. The manner by which this is accomplished will now be described in detail with particular reference to FIGURES 2 and 3. As illustrated, the pressurization unit 22 includes a pair of primary jet compressors or jet pumps 30 each including a nozzle 32 connected to a respective engine by one of the conduits 23. It should be noted at this time that there are the same number of primary jet compressors 30 as there are engines, the nozzle 32 of each primary jet compressor 30 being connected to only one engine. The nozzle 32 of each jet compressor 30 is positioned within a converging duct 33 to discharge the bleed air at high velocity into a mixing chamber 34, which is a cylindrical extension of the converging duct 33. At its other end, the duct 33 is connected to the intake duct 25 which receives atmospheric air from the inlet 24, the inlet 24 preferably being disposed as shown to scoop or ram air into the duct 25 during flight at a total pressure somewhat greater than that of the ambient atmosphere. During operation, relatively low pressure ram air inducted through the inlet 24 is thus supplied to the mixing chamber 34 where it is entrained and mixed with the high velocity bleed air discharged by the nozzle 32. The augmented air flow is then diffused to an intermediate pressure in a diffuser 35, which is a diverging extension of the mixing chamber 34. One-way check valves 36 are located at the large area, or downstream, ends of the diffusers 35 for permitting flow therefrom to a plenum 37, but preventing reverse flow from the plenum 37 through an inoperative jet compressor 30. From the plenum 37, the pressurized air is supplied to the aircraft cabin 20 by exhaust ducting indicated generally by the numeral 26, the exhaust ducting 26 including heat exchange apparatus for selectively extracting heat from the pressurized air so as to permit control of the cabin temperature.

Figure 2:
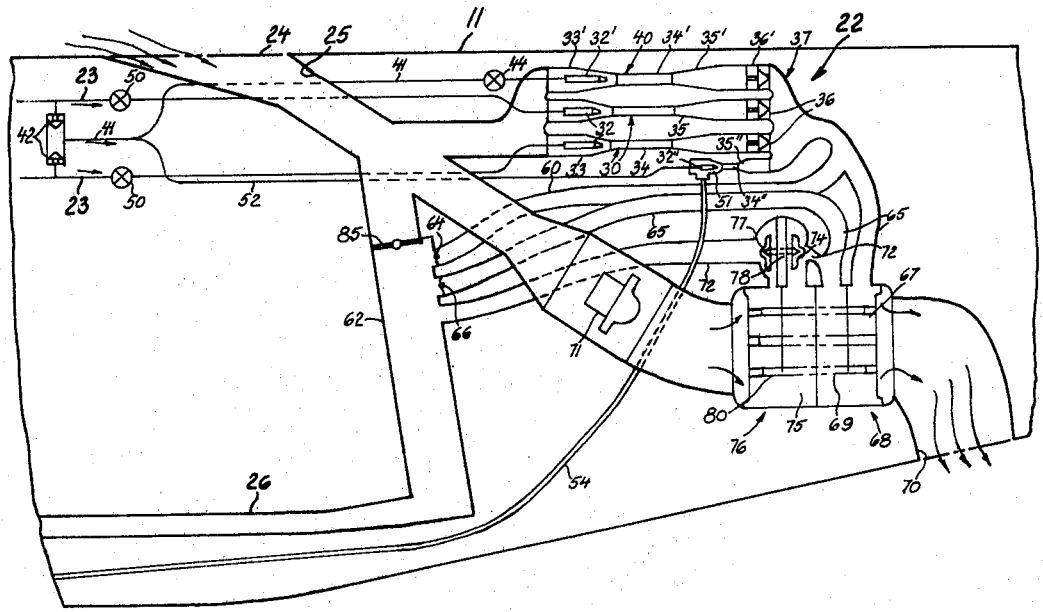
FIGURE 2 is a view, partially schematic, of the pressurization system of FIGURE 1 taken along viewing line 2—2.
Figure 3:
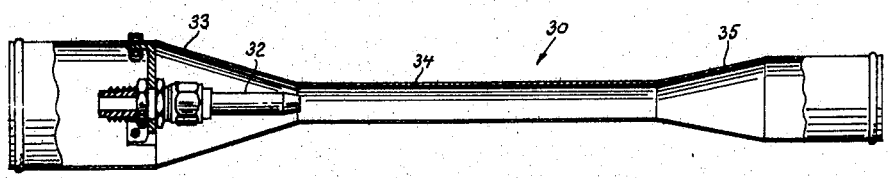
FIGURE 3 is a cross-sectional view of one of the jet compressors utilized in the pressurization system.

Still referring to FIGURES 2 and 3, an auxiliary jet compressor 40 is connected to each of the engines 14 by a high pressure conduit 41 connected to the conduits 23 by suitable one-way check valves 42 which permit flow of bleed air to the auxiliary jet compressor 40, but prevent reverse flow to an inoperative engine. A shut-off valve 44 is located in the conduit 41 for selectively controlling flow of high pressure compressed air to the nozzle 32' of the auxiliary jet compressor 40, the valve 44 normally being closed and the auxiliary jet compressor 40 therefore normally being inoperative. While shut-off valves 50 are similarly located in the conduits 23 for controlling flow of bleed air to the primary jet compressors 30, they are normally open and the primary jet compressors are therefore normally operative during engine operation. In all other respects, the auxiliary jet compressor 40 is similar to the primary jet compressors 30. More particularly, the auxiliary jet compressor 40 includes a converging duct 33' for receiving ram air from the intake duct 25, a mixing chamber 34' for receiving both ram air from the duct 33' and expanded bleed air from the nozzle 32', and a diffuser 35' for increasing the pressure of the augmented air stream to a suitable level for cabin pressurization. A one-way check valve 36' permits flow of diffused air to the plenum 37 while preventing reverse flow through the auxiliary jet compressor 40 when it is inoperative.

A vacuum jet compressor 51 of more limited flow capacity is also provided, its purpose being to provide a vacuum for the aircraft instrumentation and for certain anti-icing equipment. More particularly, the vacuum jet compressor 51 includes a nozzle 32'' which is connected to all of the engines 14 by a high pressure conduit 52, the conduit 52 being connected to the conduit 41 downstream of the one-way valves 42. Since it is desirable that the vacuum system operate whenever one or more engines are operating, there is no necessity to provide a shut-off valve upstream of the nozzle 32'' or a one-way valve between the diffuser 35'' and the plenum 37. The vacuum jet compressor 51 differs from the primary and auxiliary jet compressors in that its source of low pressure air is not the atmosphere, but rather the aircraft areas in which it is desired to maintain a vacuum, or pressure lower than that of the ambient atmosphere. Low pressure air is supplied from such areas to the mixing chamber 34'' by a low pressure conduit 54.

During normal operation of the pressurization system of this invention with all engines 14 operating, the shut-off valves 50 in the conduits 23 are open to permit unhindered flow of compressor bleed air to the nozzles 32 of the primary jet compressors 30, and the shut-off valve 44 in the conduit 41 is closed to prevent flow of compressor bleed air to the auxiliary jet compressor 40. The nozzle 32'' of the vacuum jet compressor 51 is, of course, supplied with compressor bleed air through the conduits 23, 41 and 52. Relatively low pressure atmospheric air, which has a total pressure slightly higher than that of the ambient atmosphere during flight because of the ram effect, is supplied by the intake duct 25 to the mixing chambers 34 of the primary jet compressors 30. Because of the lower pressure existing within the mixing chamber 34 as a result of the expansion of the compressor bleed air through the nozzle 32, the atmospheric air supplied by the duct 25 flows into the mixing chamber 34 where it is entrained by and mixed with the compressor bleed air. The augmented air flow, which may be several times as great as the flow of the compressor bleed air alone, is then diffused in the diffuser 35 to a pressure suitable for cabin pressurization, after which the air is supplied through the plenum 37 and the exhaust ducting 26 to the aircraft cabin 20. During normal flight conditions, the arrangement just described provides an adequate flow of pressurization air. Under circumstances such as might exist during ground operation, the flow from the primary jet compressors 30 may be inadequate for cabin cooling. In such a case, the shut-off valve 44 in the conduit 41 could be opened, thus permitting additional augmentation resulting from operation of the auxiliary jet compressor 40. Similarly, the auxiliary jet compressor 40 can be used for increasing the system heating capacity. It should be appreciated, however, that utilization of the auxiliary jet compressor 40 will result in somewhat reduced engine performance and efficiency because of the additional bleed air required for operation.

In the foregoing description, a number of one-way or check valves 36, 42 and 36' have been identified, their purpose being to prevent reverse flow through inoperative jet compressors and engines. To explain in greater detail, it may be assumed that one of the engines of the aircraft is not operating. In such a case, high pressure compressor bleed air from the operative engine could flow through the conduits 23 to the inoperative engine if it were not for the check valves 42. Similarly, if it were not for the check valves 36, pressurized air from the plenum 37 could flow through the nozzle 32 leading to the inoperative engine. Furthermore, the check valves 36 and 36' prevent escape of pressurized air from the plenum 37 through inoperative ones of the jet compressors 30 and 40 to the intake duct 25, which has a normal pressure substantially below that existing in the plenum 37.

As indicated above, the exhaust ducting 26 leading to the aircraft cabin 20 includes heat exchange apparatus for selectively extracting heat from the pressurized air so as to control the cabin temperature. With particular reference to FIGURE 2, the exhaust ducting 26 includes a first conduit or duct 60 directly interconnecting the plenum 37 and the cabin 20 as represented by a header 62. An adjustable valve 64 is located in the first conduit 60 for controlling the amount of air that flows directly from the plenum 37 to the cabin 20. Since the augmented bleed air supplied to the plenum 37 is ordinarily at a temperature much higher than that desired for cabin pressurization, a second conduit or duct 65 also interconnects the plenum 37 and the cabin header 62 for supplying relatively cool pressurized air to the cabin 20. This second conduit 65, which has an adjustable valve 66 therein for controlling the rate of cooling air flow, serially interconnects the plenum 37, a first set of heat exchange passages 67 of a heat exchanger 68, and the cabin header 62. The heat exchanger 68 also includes a second set of passages 69 which receive relatively cool atmospheric air from the intake duct 25. The relatively hot pressurized air flowing through the conduit 65 and the first set of passages 67 is thus cooled by the atmospheric air flowing through the second set of passages 69. After cooling the pressurized air in the first set of heat exchange passages 67, the atmospheric air, which is now quite warm as a result of the heat exchange process, is dumped overboard through an outlet 70. To enhance the rate of heat exchange within the heat exchanger 68, a fan 71 may be provided within the intake duct 25 for increasing the rate of flow through the second set of heat exchange passages 69. From the foregoing, it will be obvious to those skilled in the art that the temperature within the aircraft cabin 20 may be varied within rather large limits by manipulation of the valves 64 and 66 in the first and second conduits 60 and 65, respectively. However, in the event that additional cooling is desired, a third conduit 72 may be connected to the second conduit 65 downstream of the heat exchanger 68, the third conduit 72 directing the cooled air serially through a compressor 74, a first set of heat exchange passages 75 of a supplementary heat exchanger 76, and a turbine 77. The turbine 77 drives the compressor 74 through a shaft 78. The supplementary heat exchanger 76 further includes a second set of passages 80 disposed in heat exchange relationship with respect to the first set of heat exchange passages 75, the second set of passages being supplied, as the second set of passages 69 of the heat exchanger 68, with relatively cold atmospheric air from the intake duct 25. In operation, the relatively cool pressurized air leaving the first heat exchanger 68 and entering the third conduit 72 is compressed to a higher temperature and pressure by the compressor 74. The higher temperature air is then cooled in the supplementary heat exchanger 76 by the atmospheric air flowing through the second set of passages 80. The cooled air, which is still at a relatively high pressure relative to that existing in the cabin 20, is then expanded through the turbine 77 to drive the compressor 74. The net result of this arrangement is a further cooling of the air which is supplied through the third conduit 72 to the cabinet 20. The flow orifices within the third conduit 72, particularly the flow areas of the nozzles to the turbine 77, are such that there is relatively little flow through the third conduit 72 whenever either of the valves 64 and 66 is in an open position. Thus, to supply pressurized air at the coolest possible temperature to the cabin 20, both valves 64 and 66 should be closed so that the entire flow of pressurized air is directed through the supplementary heat exchanger 76 as well as the main heat exchanger 68.

It is conceivable, of course, that for some reason it might be wished during aircraft operation to have an unpressurized cabin. In such an event, the shut-off valves 50 and 44 to the primary and auxiliary jet compressors 30 and 40, respectively, would be closed to prevent flow of compressor bleed air to the jet compressors, and the valve 85 leading from the intake duct 25 to the cabin header 62 would be opened to permit direct flow of unpressurized air to the cabin 20.

Various alternative arrangements will, of course, be obvious to those skilled in the art. For example, the supplementary cooling means between the heat exchanger 68 and the cabin header 62 could take on forms other than that described. For example, a cooling coil or other suitable refrigeration apparatus could be inserted into the third conduit 72 to further reduce the air temperature. Similarly, it should be recognized that the jet compressors 30, 40 and 51 can take on other forms. In particular, the separate mixing and diffusing sections could be combined into a single section in which both mixing and diffusion occur. It should also be appreciated that the pressurization system of this invention could be used for purposes other than aircraft cabin pressurization, and that the high pressure air may be supplied by apparatus other than the compressors of gas turbine engines.

From the foregoing, it will be appreciated that the improved pressurization system of this invention provides an adequate flow of pressurized air without requiring the extraction of an excessive amount of compressor bleed air, the bleed air being augmented in large measure by atmospheric air inducted from the outside of the aircraft. Accordingly, the reduction in engine power resulting from the bleeding off of compressed air is minimal. Furthermore, the jet compressors 30, 40 and 50 are relatively simple and light weight devices having no moving parts. The overall pressurization system is thus not only simple, efficient and reliable in operation, but also relatively inexpensive to manufacture and maintain.

While a particular embodiment of the invention has been shown and described, it will be understood that various changes and modifications may be made without departing from the spirit and scope of the invention.

What is claimed as new and is desired to secure by Letters Patent is:

1. In an aircraft including a source of high pressure air, a pressurization system comprising:
    at least one jet compressor including a nozzle and a diffuser,
    intake means communicating with said jet compressor for supplying low pressure atmospheric air thereto from the exterior of the aircraft,
    means communicating with said nozzle for supplying high pressure air thereto from the source of high pressure air,
    and exhaust means communicating with said diffuser for delivering air therefrom,
    whereby high velocity air discharged from said nozzle into said jet compressor entrains atmospheric air and the pressure of the augmented air flow is increased to an intermediate pressure in said diffuser.

2. In an aircraft including a substantially closed cabin and a source of high pressure air, a cabin pressurization system comprising a pressurization system as defined by claim 1 in which said exhaust means interconnects said diffuser and the aircraft cabin for delivering pressurized air thereto.

3. An aircraft cabin pressurization system as defined by claim 2 in which said exhaust means further includes heat exchange apparatus for selectively extracting heat from the pressurized air.

4. In an aircraft including a substantially closed cabin and a source of high pressure air, a cabin pressurization system comprising a pressurization system as defined by claim 1 in which said exhaust means comprises:
    first conduit means directly interconnecting said diffuser and the aircraft cabin for delivering relatively hot pressurized air to the cabin,
    a heat exchanger having first and second passage means disposed in heat exchange relationship,
    second conduit means interconnecting said diffuser, the first passage means of said heat exchanger, and the aircraft cabin in serial flow arrangement for delivering pressurized air to the cabin,
    said intake means communicating with the second passage means of said heat exchanger for supplying atmospheric air thereto to cool pressurized air flowing through said second conduit means, and valve means in at least one of said first and second conduit means for controlling the relative flow rates therethrough so as to thereby control the temperature within the pressurized cabin.

5. An aircraft cabin pressurization system as defined by claim 4 in which said intake means includes an inlet disposed relative to the aircraft to scoop atmospheric air into said intake means during flight, whereby low pressure air supplied during flight to said jet compressor and the second passage means of said heat exchanger has a total pressure greater than that of the ambient atmosphere.

6. In an aircraft including a substantially closed cabin and a plurality of turbine engines, a cabin pressurization system comprising:

a plurality of primary jet compressors each including a mixing chamber, a nozzle positioned to discharge into said mixing chamber, and a diffuser communicating with said mixing chamber for receiving fluid therefrom, intake means communicating with said mixing chambers for supplying low pressure atmospheric air thereto from the exterior of the aircraft, a plurality of means each communicating with one of said nozzles for supplying high pressure compressor bleed air thereto from a respective one only of the turbine engines, and exhaust means communicating with said diffusers for delivering intermediate pressure air therefrom to the aircraft cabin.

7. An aircraft cabin pressurization system as defined by claim 6 further comprising a plurality of one-way valves each located between a respective one of said diffusers and said exhaust means for permitting flow of pressurized air to said exhaust means and preventing reverse flow of pressurized air through inoperative ones of said primary jet compressors.

8. An aircraft pressurization system as defined by claim 7 in which said exhaust means comprises:

first conduit means directly interconnecting said diffuser and the aircraft cabin for delivering relatively hot pressurized air to the cabin, a heat exchanger having first and second passage means disposed in heat exchange relationship, second conduit means interconnecting said diffuser, the first passage means of said heat exchanger, and the aircraft cabin in serial flow arrangement for delivering pressurized air to the cabin, said intake means communicating with the second passage means of said heat exchanger for supplying ambient atmospheric air thereto to cool pressurized air flowing through said second conduit means, and valve means in at least one of said first and second conduit means for controlling the relative flow rates therethrough so as to thereby control the temperature within the pressurized cabin.

9. An aircraft cabin pressurization system as defined by claim 7 further comprising:

an auxiliary jet compressor including a mixing chamber, a nozzle positioned to discharge into said mixing chamber, and a diffuser communicating with said mixing chamber for receiving fluid therefrom, means communicating with the nozzle of said auxiliary jet compressor for supplying high pressure compressor bleed air thereto from each of the turbine engines, said intake means communicating with the mixing chamber and said exhaust means communicating with the diffuser of said auxiliary jet compressor, a one-way valve located between the diffuser of said auxiliary jet compressor and said exhaust means for permitting flow of pressurized air to said exhaust means and preventing reverse flow through said auxiliary jet compressor, and a plurality of one-way valves each located between a respective one of the turbine engines and said high pressure supply means for preventing reverse flow of pressurized air through said high pressure supply means to inoperative ones of the engines.

10. An aircraft cabin pressurization system as defined by claim 7 further comprising:

a vacuum jet compressor including a mixing chamber, a nozzle positioned to discharge into said mixing chamber, and a diffuser communicating with said mixing chamber for receiving fluid therefrom, means communicating with the nozzle of said auxiliary jet compressor for supplying high pressure compressor bleed air thereto from each of the turbine engines, secondary intake means communicating with the mixing chamber for supplying air thereto at a pressure less than that of the ambient atmosphere, said exhaust means communicating with the diffuser of said auxiliary jet compressor, and a plurality of one-way valves each positioned between a respective one of the turbine engines and said high pressure supply means for preventing reverse flow of pressurized air through said high pressure supply means to inoperative ones of the engines.

11. An aircraft cabin pressurization system as defined by claim 7 further comprising:

an auxiliary jet compressor including a mixing chamber, a nozzle positioned to discharge into said mixing chamber, and a diffuser communicating with said mixing chamber for receiving fluid therefrom, a vacuum jet compressor including a mixing chamber, a nozzle positioned to discharge into said mixing chamber, and a diffuser communicating with said mixing chamber for receiving fluid therefrom, means communicating with the nozzles of said auxiliary and vacuum jet compressors for supplying high-pressure compressor bleed air thereto from each of the turbine engines, said intake means communicating with the mixing chamber of said auxiliary compressor, secondary intake means communicating with the mixing chamber of said vacuum jet compressor for supplying air thereto at a pressure less than that of the ambient atmosphere, said exhaust means communicating with the diffusers of said auxiliary and vacuum jet compressors, a one-way valve positioned between the diffuser of said auxiliary jet compressor and said exhaust means for permitting flow of pressurized air to said exhaust means and preventing reverse flow through said auxiliary jet compressor, and a plurality of one-way valves each positioned between a respective one of the turbine engines and said high pressure supply means to said auxiliary and vacuum jet compressors for preventing reverse flow of pressurized air through said high-pressure supply means to inoperative ones of the engines.

12. An aircraft cabin pressurization system as defined by claim 11 in which said intake means includes an inlet disposed relative to the aircraft to scoop atmospheric air into said intake means during flight, whereby low pressure air supplied during flight to said mixing chamber and the second passage means of said heat exchanger has a total pressure greater than that of the ambient atmosphere.

13. An aircraft cabin pressurization system as defined by claim 12 further comprising valve means in the high pressure supply means to said primary jet compressors and said auxiliary jet compressor for selectively controlling the flow of high pressure air to said jet compressors from the engines.

14. An aircraft cabin pressurization system as defined by claim 13 in which said exhaust means comprises:
first conduit means directly interconnecting said diffuser and the aircraft cabin for delivering relatively hot pressurized air to the cabin,
a heat exchanger having first and second passage means disposed in heat exchange relationship,
second conduit means interconnecting said diffuser, the first passage means of said heat exchanger, and the aircraft cabin in serial flow arrangement for delivering pressurized air to the cabin,
said intake means communicating with the second passage means of said heat exchanger for supplying ambient atmospheric air thereto to cool pressurized air flowing through said second conduit means,
and valve means in said first and second conduit means for controlling the relative flow rates therethrough so as to thereby control the temperature within the pressurized cabin.

15. An aircraft cabin pressurization system as defined by claim 14 in which said exhaust means further comprises supplementary cooling means interposed between the first passage means of said heat exchanger and the aircraft cabin for selectively extracting additional energy and thereby further cooling pressurized air flowing through said exhaust means.

16. An aircraft cabin pressurization system as defined by claim 15 in which said supplementary cooling means comprises:
a compressor,
a supplementary heat exchanger having first and second passage means disposed in heat exchange relationship,
a turbine,
third conduit means serially interconnecting said second conduit means at a point intermediate said heat exchanger and the aircraft cabin, said compressor, the first passage means of said supplementary heat exchanger, said turbine, and the aircraft cabin,
and said intake means communicating with the second passage means of said supplementary heat exchanger for supplying atmospheric air thereto to further cool pressurized air flowing through said third conduit means.

17. A pressurized aircraft comprising:
an airframe including a substantially closed cabin,
a plurality of turbine engines mounted on said airframe,
and a cabin pressurization system as defined by claim 15 for maintaining within the cabin an atmosphere of suitable pressure and temperature during aircraft operation, said cabin pressurization system being connected to said turbine engines by said high pressure supply means and to said aircraft cabin by said exhaust means.

References Cited

UNITED STATES PATENTS

| | | | |
|---|---|---|---|
| 2,697,917 | 12/1954 | Mayer | 98—1.5 |
| 2,723,615 | 11/1955 | Morris | 98—1.5 |
| 2,734,356 | 2/1956 | Kleinhaus | 98—1.5 XR |
| 3,367,256 | 2/1968 | Townsend | 98—1.5 |

MEYER PERLIN, Primary Examiner